US012459421B2

(12) United States Patent
Song

(10) Patent No.: US 12,459,421 B2
(45) Date of Patent: Nov. 4, 2025

(54) AUTONOMOUS DRIVING VEHICLE AND METHOD FOR HIGH BEAM CONTROL THEREOF

(71) Applicants: HYUNDAI MOTOR COMPANY, Seoul (KR); KIA CORPORATION, Seoul (KR)

(72) Inventor: Jun Hyung Song, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/813,859

(22) Filed: Aug. 23, 2024

(65) Prior Publication Data

US 2025/0065801 A1    Feb. 27, 2025

(30) Foreign Application Priority Data

Aug. 25, 2023   (KR) .......................... 10-2023-0111991

(51) Int. Cl.

| | |
|---|---|
| *B60Q 1/08* | (2006.01) |
| *B60Q 1/14* | (2006.01) |
| *B60W 10/20* | (2006.01) |
| *B60W 30/09* | (2012.01) |
| *B60W 30/16* | (2020.01) |
| *B60W 50/00* | (2006.01) |
| *B60W 60/00* | (2020.01) |

(52) U.S. Cl.
CPC ............. *B60Q 1/085* (2013.01); *B60Q 1/143* (2013.01); *B60W 10/20* (2013.01); *B60W 30/09* (2013.01); *B60W 30/16* (2013.01); *B60W 50/0097* (2013.01); *B60W 60/0015* (2020.02); *B60Q 2300/45* (2013.01); *B60Q 2800/10* (2022.05); *B60W 2554/4044* (2020.02); *B60W 2554/4045* (2020.02); *B60W 2554/80* (2020.02)

(58) Field of Classification Search
CPC .... B60Q 1/085; B60Q 2800/10; B60W 30/09
See application file for complete search history.

(56) References Cited

U.S. PATENT DOCUMENTS

| | | | |
|---|---|---|---|
| 8,007,146 B2* | 8/2011 | Tatara .................. | B60Q 1/1423 362/465 |
| 9,758,085 B2* | 9/2017 | Bengtsson ............. | B60Q 1/085 |
| 10,086,832 B2* | 10/2018 | Kwon ................... | B60W 10/30 |
| 11,884,293 B2* | 1/2024 | Srinivasan .......... | B60W 60/001 |
| 2020/0010079 A1* | 1/2020 | Ito ........................ | B60Q 1/1423 |

* cited by examiner

*Primary Examiner* — Robert J May
(74) *Attorney, Agent, or Firm* — Lempia Summerfield Katz LLC

(57) ABSTRACT

A method of controlling an autonomous vehicle includes sensing, using a first sensor, an object located in front of the autonomous vehicle as the autonomous vehicle is driving on a driving path using a low beam of a headlight mounted on the autonomous vehicle. The method also includes, when a portion of the object is exposed by the low beam and is additionally sensed by a second sensor, switching, by a processor, the low beam to a high beam.

17 Claims, 7 Drawing Sheets

AUTONOMOUS DRIVING VEHICLE AND METHOD FOR HIGH BEAM CONTROL THEREOF

CROSS-REFERENCE TO RELATED APPLICATION

This application claims the benefit of and priority to Korean Patent Application No. 10-2023-0111991, filed on Aug. 25, 2023, the entire contents of which are hereby incorporated by reference as if fully set forth herein.

BACKGROUND

Technical Field

The present disclosure relates to an autonomous vehicle and a control method thereof. More particularly, the present disclosure relates to an autonomous vehicle and control method that recognize early a pedestrian present ahead at a distance on a dark road using a front radar and a front camera and operate, at an appropriate time, warning and braking control of a forward collision-avoidance assist (FCA) function.

Discussion of Related Art

On a dark road (e.g., at night), there may be a situation where, even if there is a pedestrian in front of a vehicle, a front camera mounted on the vehicle is not able to recognize the pedestrian before the pedestrian is exposed to light. Because a low beam of the vehicle may not sufficiently illuminate the pedestrian from a distance, and because there is a regulation that the angle of headlights be set below horizontal, the low beam of the vehicle may only gradually illuminate the pedestrian from the lower body to the upper body of the pedestrian as the vehicle approaches the pedestrian, which may make it difficult for the front camera to recognize the pedestrian from a distance.

On the other hand, a forward collision-avoidance assist (FCA) function using a front camera sensor may recognize a target only when the target is visible. Therefore, as the vehicle approaches a pedestrian present in the distance, the pedestrian may be illuminated from the lower body to the upper body and may thus be recognized by the FCA function relatively late. As a result, warning and braking control of the FCA function may not be activated at an appropriate time, which may increase the risk of collision.

SUMMARY

Aspects the present disclosure provide an autonomous vehicle and a control method thereof that may recognize early a pedestrian present ahead in the distance using a front radar and a front camera while the vehicle is driving with a low beam on a dark road (e.g., at night). The autonomous vehicle and control method may then switch to a high beam to illuminate the whole body of the pedestrian. This allows the front camera to identify the pedestrian. The autonomous vehicle and control method may thus operate, at an appropriate time, a warning and braking control of a forward collision-avoidance assist (FCA) function.

The technical objects to be achieved by the present disclosure are not limited to those described above. Other technical objects not described above may also be clearly understood by those having ordinary skill in the art from the following description.

According to an aspect of the present disclosure, a method of controlling an autonomous vehicle is provided. The method includes sensing, using a first sensor, an object located in front of the autonomous vehicle as the autonomous vehicle is driving on a driving path using a low beam of a headlight mounted on the autonomous vehicle. The method also includes, when a portion of the object is exposed by the low beam and is additionally sensed by a second sensor, switching, by a processor, the low beam to a high beam.

In at least one embodiment of the present disclosure, the method further includes, in response to switching to the high beam, setting, by the processor, the object to be a target. The method may additionally include determining, by the processor, a braking distance between the autonomous vehicle and the target.

In at least one embodiment of the present disclosure, the method further includes controlling, by the processor, a forward collision-avoidance assist (FCA) system or steering of the vehicle, based on the determined braking distance.

In at least one embodiment of the present disclosure, controlling the FCA system or the steering includes controlling the FCA system in response to determining, by the processor, that the determined braking distance is greater than a preset safety distance.

In at least one embodiment of the present disclosure, controlling the FCA system or the steering controlling the steering in response to determining, by the processor, that the determined braking distance is less than a preset safety distance.

In at least one embodiment of the present disclosure, switching the low beam to the high beam includes switching the low beam gradually to the high beam.

In at least one embodiment of the present disclosure, the method further includes predicting at least one of a movement of the object or a direction of the object while determining the braking distance.

In at least one embodiment of the present disclosure, the method further comprises re-determining the braking distance based on the at least one of the movement of the object or the direction of the object.

In at least one embodiment of the present disclosure, the method further includes controlling an FCA system or steering of the vehicle, based on the re-determined braking distance.

According to another aspect of the present disclosure, a non-transitory computer-readable storage medium storing computer-readable instructions is provided. The computer-readable instructions, when executed by the processor, cause the processor to perform operations. The operations include sensing, using a first sensor, an object located in front of an autonomous vehicle as the autonomous vehicle is driving on a driving path using a low beam mounted on the autonomous vehicle. The operations also include, when a portion of the object is exposed by the low beam and is additionally sensed by a second sensor, switch the low beam to a high beam.

According to another aspect of the present disclosure, autonomous vehicle is provided. The autonomous vehicle includes a headlight, a first sensor, a second sensor, and a processor configured to control the headlight. The processor is configured to sense, using the first sensor, an object located in front of the autonomous vehicle as the autonomous vehicle is driving on a driving path using a low beam. The processor is also configured to, when a portion of the object is exposed by the low beam and is additionally sensed by the second sensor, switch the low beam to a high beam.

In at least one embodiment of the present disclosure, the processor is further configured, in response to switching to the high beam, set the object to be a target. The processor may also be configured to determine a braking distance between the autonomous vehicle and the target.

In at least one embodiment of the present disclosure, the processor is further configured to control a forward collision-avoidance assist (FCA) system or steering, based on the determined braking distance.

In at least one embodiment of the present disclosure, the processor is configured to in response to determining that the determined braking distance is greater than a preset safety distance, control the FCA system.

In at least one embodiment of the present disclosure, the processor is configured to, in response to determining that the determined braking distance is less than the preset safety distance, control the steering.

In at least one embodiment of the present disclosure, the processor is configured to control the autonomous vehicle to switch the low beam gradually to the high beam.

In at least one embodiment of the present disclosure, the processor is further configured to predict at least one of a movement of the object or a direction of the object while determining the braking distance.

In at least one embodiment of the present disclosure, the processor is further configured to re-determine the braking distance based on the at least one of the movement of the object or the direction of the object.

In at least one embodiment of the present disclosure, the processor is configured to control the autonomous vehicle to control an FCA system or steering, based on the re-determined braking distance.

According to embodiments of the present disclosure, the autonomous vehicle and control method thereof may recognize early a pedestrian present ahead in the distance using a front radar and a front camera while the vehicle is driving on a dark road (e.g., at night) with a low beam on. The autonomous vehicle and the control method may switch the low beam to a high beam to operate the high beam to illuminate the whole body of the pedestrian such that the front camera identifies the pedestrian, The autonomous vehicle and the control method may operate warning and braking control of an FCA function at an appropriate time, thereby improving the driving stability of the autonomous vehicle.

In addition, the autonomous vehicle and control method thereof may use the front radar capable of sensing an object (e.g., pedestrian) present ahead in the distance to allow the autonomous vehicle driving on a dark road (e.g., at night) with the low beam on to recognize the pedestrian normally at an appropriate time. The autonomous vehicle and the control method may use the front camera to recognize a lower body of the pedestrian, thereby enhancing the recognition accuracy.

In addition, the autonomous vehicle and control method thereof may determine a pedestrian present in the distance on a dark road using an enhanced method and may quickly recognize the pedestrian using the front camera by switching headlights from a low beam to a high beam, thereby controlling the warning and braking of the FCA function at a normal timing.

In addition, the autonomous vehicle and control method thereof may switch to steering control, rather than FCA braking control, when a collision is predicted due to late recognition of a pedestrian and an insufficient braking distance, thereby facilitating the avoidance of the pedestrian.

The effects that can be achieved from the present disclosure are not limited to those described above. Other effects not described above should be more clearly understood by those having ordinary skill in the art from the following description.

DETAILED DESCRIPTION OF THE DISCLOSURE

Figure 1:
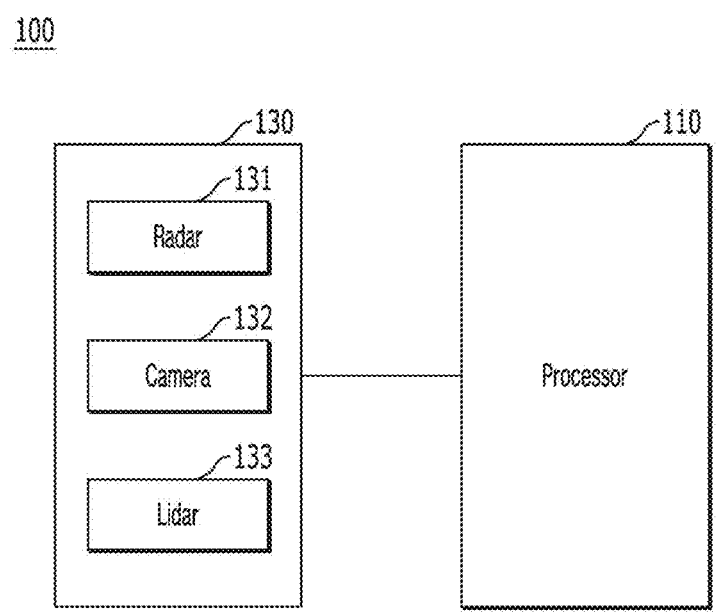
FIG. 1 is a block diagram illustrating an autonomous vehicle, according to an embodiment of the present disclosure.

Hereinafter, embodiments of the present disclosure are described in detail with reference to the accompanying drawings. In the accompanying drawings, the same or similar elements are designated with the same reference numerals regardless of reference symbols, and a repeated description thereof has been omitted. Further, in describing the embodiments, where it was determined that a detailed description of related publicly known technology may obscure the gist of the embodiments described herein, the detailed description thereof has been omitted. The accompanying drawings are used to explain various technical features of embodiments of the present disclosure. It should be understood that the embodiments presented herein are not limited by the accompanying drawings.

As used herein, the terms "include," "comprise," "have," or the like, specify the presence of stated features, numbers, operations, elements, components, and/or combinations thereof. Such terms do not preclude the presence or addition of one or more other features, numbers, operations, elements, components, and/or combinations thereof. In addition, when describing embodiments with reference to the accompanying drawings, like reference numerals refer to like components and a repeated description related thereto is omitted.

The terms "unit" and "control unit" included in names such as a vehicle control unit (VCU) may be terms widely used in the naming of a control device or controller configured to control vehicle-specific functions. Such terms may not refer to a generic function unit. For example, each controller or control unit may include a communication device that communicates with other controllers or sensors to control a corresponding function, a memory that stores an operating system (OS) or logic commands and input/output information, and a processor that performs determination, calculation, selection, and the like necessary to control the function.

When a component, device, element, or the like of the present disclosure is described as having a purpose or performing an operation, function, or the like, the component, device, or element should be considered herein as being "configured to" meet that purpose or perform that operation or function.

Figure 2:
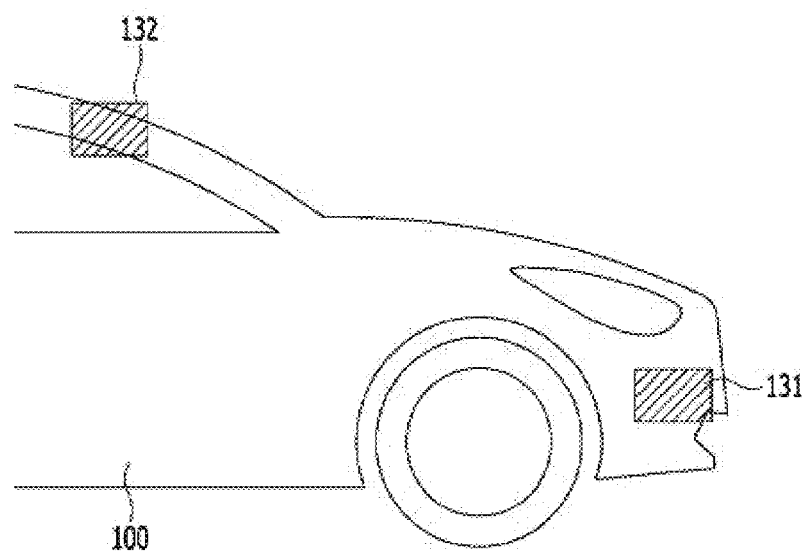
FIG. 2 is a diagram illustrating an autonomous vehicle equipped with a first sensor and a second sensor, according to an embodiment of the present disclosure.

FIG. 1 is a block diagram illustrating an autonomous vehicle, according to an embodiment of the present disclosure. FIG. 2 is a diagram illustrating an autonomous vehicle equipped with a first sensor and a second sensor, according to an embodiment of the present disclosure.

Referring to FIGS. 1 and 2, according to an embodiment of the present disclosure, an autonomous vehicle 100 may include a processor 110 and a plurality of sensors 130.

The sensors 130 may include front detection sensors 130 disposed in the front of the autonomous vehicle 100 or a different vehicle. For example, the sensors 130 may include a radar 131, a camera 132, and a lidar 133. The radar 131 may also be referred to herein as a first sensor, the camera 132 may also be referred to herein as a second sensor, and the lidar 133 may also be referred to herein as a third sensor.

The radar 131 may be provided as at least one radar in the autonomous vehicle 100. The radar 131 may measure a relative speed and a relative distance with respect to a recognized object, along with a wheel speed sensor (not shown) provided in the autonomous vehicle 100. For example, the radar 131 may be provided in the front of the autonomous vehicle 100 to recognize an object present ahead.

The camera 132 may be provided as at least one camera in the autonomous vehicle 100. The camera 132 may capture an image of an object present around the autonomous vehicle 100 and an image of a state of the object, and output image data based on information associated with the captured image. For example, the camera 132 may be provided in the autonomous vehicle 100 to recognize a portion of an object present ahead. For example, the camera 132 may be provided in the autonomous vehicle 100 to recognize a portion of an object present ahead or a lower body of a pedestrian present ahead that is exposed by a low beam.

The lidar 133 may be provided as at least one lidar in the autonomous vehicle 100. The lidar 133 may emit a laser pulse and measure a time at which the laser pulse reflected from an object present within a measurement range returns. The lidar 133 may sense information such as a distance to an object, a direction of the object, and a speed of the object, and may output lidar data based on the sensed information. The term "object" as used herein may be an obstacle, a person, a thing, or the like, that is present outside the autonomous vehicle 100.

The processor 110 may sense an object present in front of the autonomous vehicle 100 using the first sensor while the autonomous vehicle is driving on a dark driving path (e.g., at night) using a low beam provided in the autonomous vehicle 100. For example, the processor 110 may sense an object located in front of the autonomous vehicle 100, even in an area that is not reachable by the low beam, using the radar 131.

When a portion of the object is exposed by the low beam and is additionally sensed by the second sensor different from the first sensor, the processor 110 may control the low beam to be switched to a high beam. For example, when the portion of the object is exposed by the low beam, the processor 110 may recognize, using the camera 132, the object that has been sensed by the radar 131. In this case, when the portion of the object present ahead is recognized, the processor 110 may switch the low beam to the high beam, enabling better recognition of the object ahead.

In an embodiment, in response to switching to the high beam, the processor 110 may set, as a target, the object additionally sensed through the camera 132, which is the second sensor. The processor 110 may then determine a braking distance between the autonomous vehicle 100 and the object based on a result of the setting. For example, in response to switching to the high beam, the processor 110 may predict or estimate various data about the object sensed through the camera 132. For example, the processor 110 may analyze the sensed object to predict or estimate a movement of the object, a direction of the object, a speed of the object, a braking distance between the object and the autonomous vehicle 100, a relative speed between the object and the autonomous vehicle 100, and the like.

The processor 110 may control a forward collision-avoidance assist (FCA) system and/or steering, based on the determined braking distance. This is described in more detail below.

Figure 3:
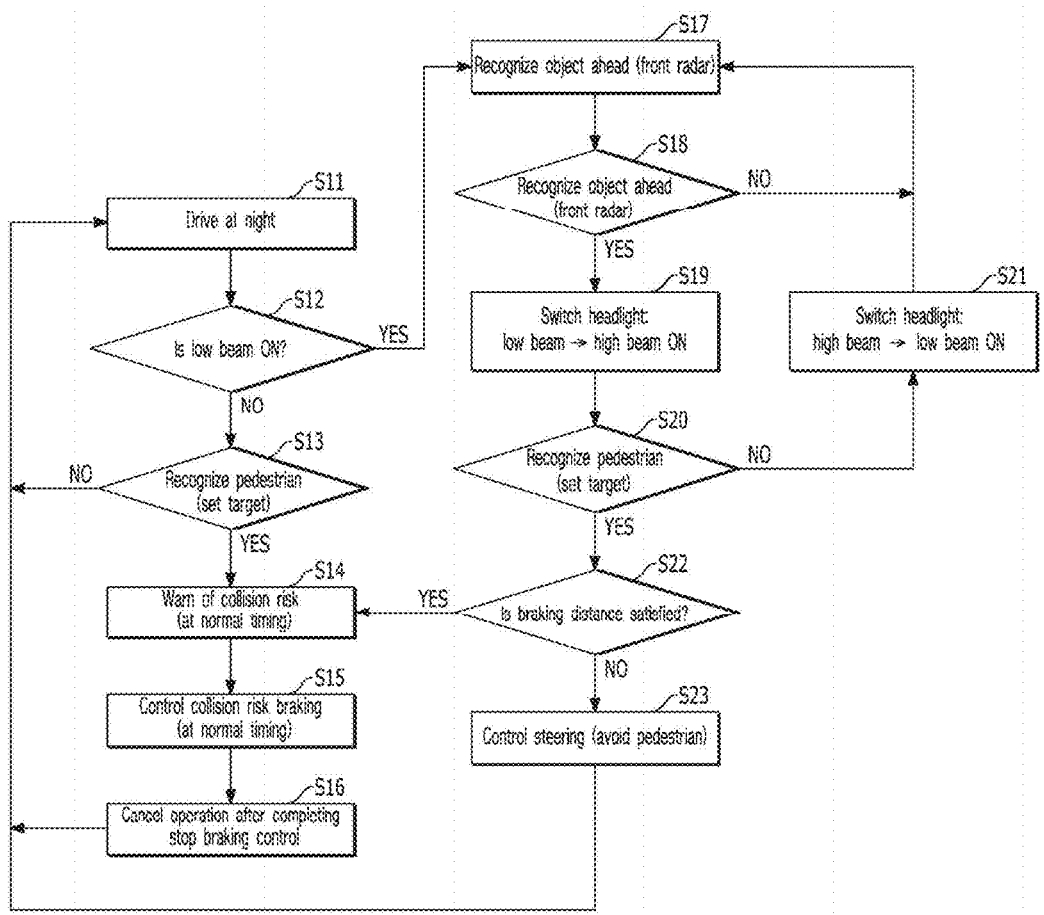
FIG. 3 is a flowchart illustrating a method of controlling an autonomous vehicle, according to an embodiment of the present disclosure.
Figure 4A:
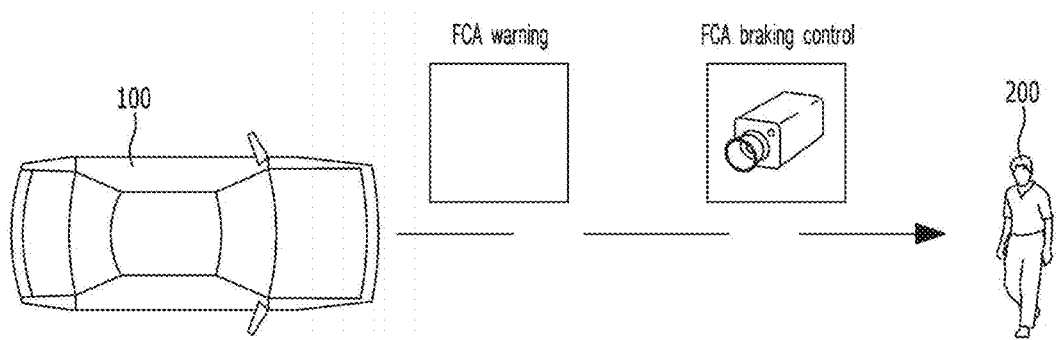
FIGS. 4A and 4B are diagrams illustrating a method of controlling a forward collision-avoidance assist (FCA) system or steering, according to an embodiment of the present disclosure.
Figure 4B:
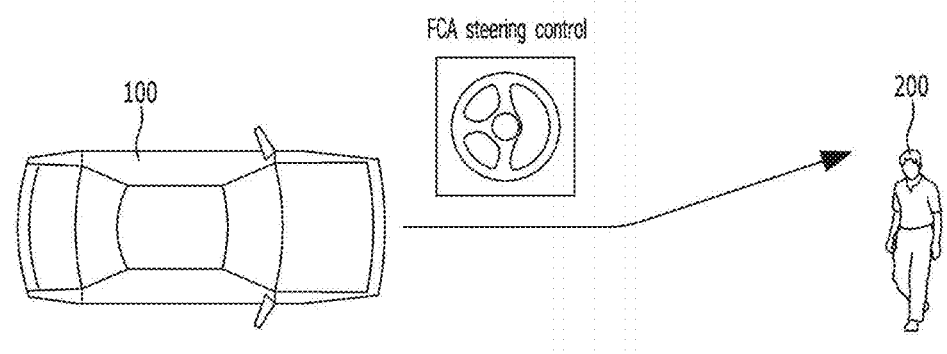

FIG. 3 is a flowchart illustrating a method of controlling an autonomous vehicle, according to an embodiment of the present disclosure. FIGS. 4A and 4B are diagrams illustrating a method of controlling an FCA system or steering, according to an embodiment of the present disclosure.

Referring to FIG. 3, a method of controlling an autonomous vehicle according to an embodiment of the present disclosure is as follows.

The autonomous vehicle 100 may drive on a vehicle driving path under the control of the processor 110. When it is determined as night driving in a step or operation S11 while the autonomous vehicle 100 is driving on the vehicle driving path, the autonomous vehicle 100 may activate or deactivate a low beam in a step or operation S12, under the control of the processor 110. For example, when the low beam is activated, a downward light may be activated.

A low beam as used herein may refer to a light located in the front of the autonomous vehicle 100 to secure forward visibility for safety during night driving. Although the low beam is used to secure the forward vision of a driver, it may shine or blink toward the bottom of the driving path, rather than fully illuminating the front side of the vehicle. Accordingly, a downward light emitted through the low beam may shine or blink toward the bottom of the driving path.

A high beam as used herein may refer to a light located in the front of the autonomous vehicle 100 to secure forward visibility for safety during night driving. The high beam may shine or blink fully toward the front side of the autonomous vehicle 100 to secure the forward vision of the driver. Accordingly, an upward light emitted through the high beam may shine or blink toward the front side of the autonomous vehicle 100.

A headlight may include the low beam and the high beam. The expression "the low beam of the headlight" as used herein may also indicate that the downward light is activated. The expression "the high beam of the headlight" as used herein may also indicate the upward light is activated.

In a step or operation S13, when the low beam is deactivated, the autonomous vehicle 100 may recognize an object 200 located in front of the autonomous vehicle 100, under the control of the processor 110. The object 200 may include a pedestrian 200, a thing, or the like. For example, a case where the low beam is deactivated may indicate a situation where a surrounding area of a driving lane is brighter than the standard brightness, and thus a dimmed light or a fog light is activated. For example, when the autonomous vehicle 100 is driving on a driving lane in an auto mode and the surrounding area of the driving lane is brighter than the standard brightness, the low beam may be deactivated. However, examples are not limited to the foregoing examples. For example, the case where the low beam is deactivated may indicate a situation e the surrounding area of the driving lane is darker than the standard darkness and the high beam is thus activated.

Subsequently, the autonomous vehicle 100 may recognize the pedestrian 200 located in front of the autonomous vehicle 100 and determine it as a target, under the control of the processor 110.

when the recognized pedestrian 200 is determined as the target, the autonomous vehicle 100 may determine a braking distance based on the pedestrian 200, under the control of the processor 110.

In a step or operation S14, the autonomous vehicle 100 may activate an FCA system and warn of a risk of collision based on the determined braking distance, under the control of the processor 110, as shown in FIG. 4A.

In a step or operation S15, the autonomous vehicle 100 may control collision risk braking after warning of the risk of collision, under the control of the processor 110. Accordingly, the autonomous vehicle 100 may prevent a collision with the object 200.

For example, as shown in FIG. 4A, when the FCA system is activated, the autonomous vehicle 100 may compare and analyze a preset safety distance and the determined braking distance. In a step or operation S14, the autonomous vehicle 100 may warn of the risk of collision. In a step or operation S15, the autonomous vehicle 100 may sequentially control the collision risk braking based on a result of the comparing and analyzing, under the control of the processor 110.

In a step or operation S16, when stop braking control is completed, the autonomous vehicle 100 may deactivate the FCA system or cancel the operation, under the control of the processor 110.

In a step or operation S17, when the low beam is activated, the autonomous vehicle 100 may sense the object 200 located in front of the autonomous vehicle 100 using a first sensor, under the control of the processor 110. For example, the autonomous vehicle 100 may recognize the object 200 present ahead, using a radar or a front radar, under the control of the processor 110. For example, the autonomous vehicle 100 may use the radar to sense the object 200 located in front of the autonomous vehicle 100 up to an area where the low beam does not reach, under the control of the processor 110.

In a step or operation S18, when a portion of the object 200 is exposed by the low beam, the autonomous vehicle 100 may recognize the portion of the object 200 using a second sensor different from the first sensor, under the control of the processor 110. For example, in the step or operation S18, when a lower body of the pedestrian 200 is exposed by the low beam, the autonomous vehicle 100 may recognize the lower body of the pedestrian 200 using a camera, under the control of the processor 110.

In a step or operation S19, when the portion of the object 200 is recognized by the low beam, the autonomous vehicle 100 may switch the low beam to the high beam, under the control of the processor 110. In the step or operation S19, the autonomous vehicle 100 may switch the low beam of the headlight to the high beam of the headlight, under the control of the processor 110.

For example, when the lower body of the pedestrian 200 is exposed by the low beam, the autonomous vehicle 100 may recognize, by the camera, the pedestrian 200 sensed by the radar, under the control of the processor 110. In this case, when the lower body of the pedestrian 200 present ahead is recognized, the processor 110 may switch the low beam to the high beam to more accurately recognize the pedestrian 200 present ahead.

In a step or operation S20, the autonomous vehicle 100 may determine, as a target, the pedestrian 200 that is additionally sensed through the camera after the switch from the low beam to the high beam, under the control of the processor 110.

In a step or operation S21, when the sensed pedestrian 200 is not determined as the target, the autonomous vehicle 100 may switch the high beam to the low beam, under the control of the processor 110. For example, the autonomous vehicle 100 may switch the high beam of the headlight to the low beam of the headlight under the control of the processor 110.

In a step or operation S22, when the pedestrian 200 is determined or set as the target in step S20, the autonomous vehicle 100 may determine a braking distance between the autonomous vehicle 100 and the pedestrian 200 based on the determined or set result, under the control of the processor 110.

The autonomous vehicle 100 may control the FCA system in the step or operation S14 or control steering in a step or operation S23 based on the determined braking distance, under the control of the processor 110.

For example, when the determined braking distance is greater than a preset safety distance, the autonomous vehicle 100 may activate the FCA system, under the control of the processor 110. For example, when the determined braking distance is greater than the preset safety distance, this may signify that the autonomous vehicle 100 satisfies the braking distance, under the control of the processor 110.

When the determined braking distance is satisfied in the step or operation S22, the autonomous vehicle 100 may activate the FCA system and warn of a risk of collision in the step or operation S14, under the control of the processor 110, as shown in FIG. 4A.

Subsequently, after warning of the risk of collision, the autonomous vehicle 100 may control the collision risk braking in the step or operation S15 to prevent a collision with the pedestrian 200, under the control of the processor 110.

In the step or operation S23, when the determined braking distance is less than the preset safety distance, the autonomous vehicle 100 may control steering of the autonomous vehicle 100, under the control of the processor 110, as shown in FIG. 4B. Thus, when the determined braking distance is not satisfied in the step or operation S22, the autonomous vehicle 100 may avoid the pedestrian 200 by controlling the steering in the step or operation S23, under the control of the processor 110.

However, examples are not limited to the foregoing. For example, when the determined braking distance is not satisfied in the step or operation S22, the autonomous vehicle 100 may activate the FCA system but control the steering to avoid the pedestrian 200 in the step or operation S23, under the control of the processor 110.

Subsequently, when the steering control is completed, the autonomous vehicle 100 may deactivate the FCA system and the steering or may cancel the operation in the step or operation S16, under the control of the processor 110.

Figure 5A:
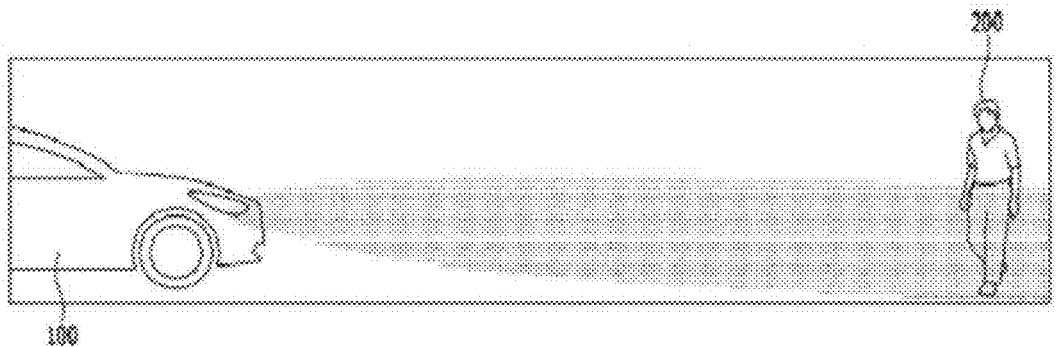
FIG. 5A-5C are diagrams illustrating an operation of a headlight, according to an embodiment of the present disclosure.
Figure 5B:
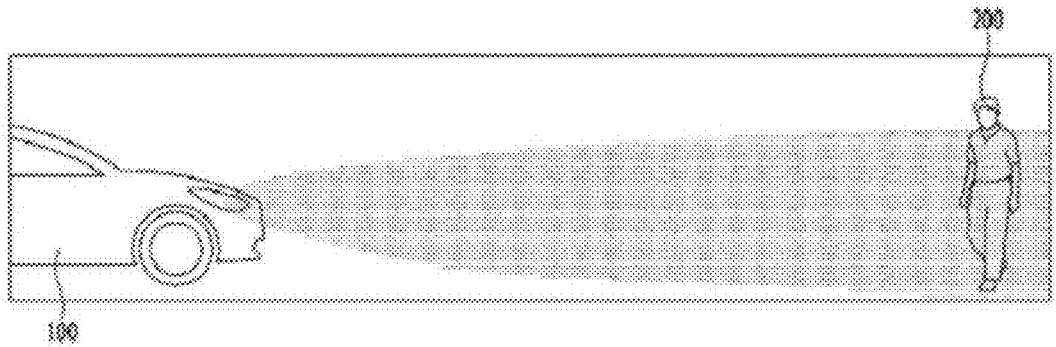
Figure 5C:
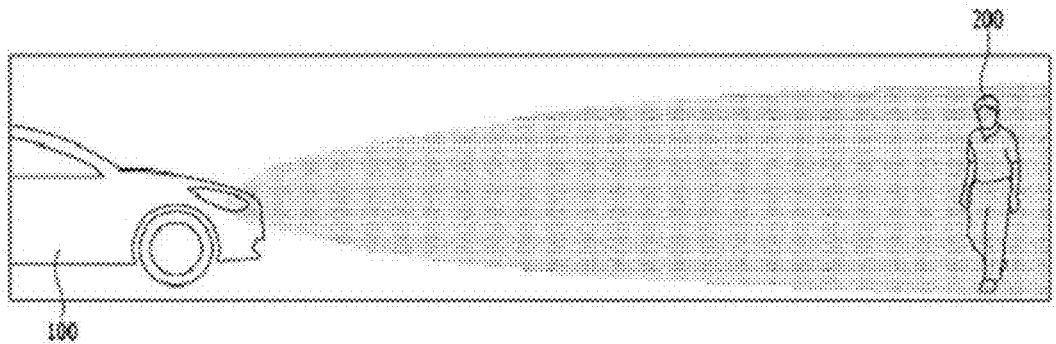

FIGS. 5A-C are diagrams illustrating an operation of a headlight, according to an embodiment of the present disclosure.

Referring to FIGS. 5A-C, when an object 200 or pedestrian 200 present ahead is recognized, the autonomous vehicle 100 may switch a headlight under the control of the processor 110.

For example, when a lower body of the pedestrian 200 is exposed by a low beam as shown in FIG. 5A, the autonomous vehicle 100 may recognize the lower body of the pedestrian 200 using a camera, under the control of the processor 110.

Subsequently, when a portion of the object 200 is recognized by the low beam as shown in FIG. 5B, the autonomous vehicle 100 may switch the low beam to a high beam, under the control of the processor 110. For example, the autonomous vehicle 100 may switch a low beam of the headlight to a high beam of the headlight under the control of the processor 110.

In an embodiment, when switching the low beam to the high beam, the autonomous vehicle 100 may control the low beam to be switched gradually to the high beam, under the control of the processor 110, as shown in FIG. 5C. The autonomous vehicle 100 may gradually switch the low beam to the high beam, under the control of the processor 110, thereby preventing a safety accident of the pedestrian 200 or animals that may occur due to glares by the high beam.

In addition, to prevent such a safety accident, the autonomous vehicle 100 may gradually switch the low beam to the high beam, but when the pedestrian 200 is clearly recognized, may control a light such that the light illuminates an upper body of the pedestrian 200, excluding a face thereof, under the control of the processor 110.

However, examples are not limited to the foregoing. For example, the autonomous vehicle 100 may gradually switch the low beam to the high beam, but lower the brightness of the high beam to be less than the brightness of the low beam, under the control of the processor 110, thereby preventing a safety accident of the pedestrian 200 or animals that may occur due to glares by the high beam.

FIGS. 6A-7B are diagrams illustrating a method of controlling an FCA system or steering, according to an embodiment of the present disclosure.

Referring to FIGS. 6A-7B, after a switch to a high beam, the autonomous vehicle 100 may predict or estimate various data about an object 200 sensed through a camera, under the control of the processor 110.

The autonomous vehicle 100 may predict at least one of a movement or a direction of the object 200 while determining a braking distance between the autonomous vehicle 100 and the object 200 based on a result of setting a target, under the control of the processor 110.

For example, the autonomous vehicle 100 may predict or estimate a movement of the object 200, a direction of the object 200, a speed of the object 200, a braking distance between the object 200 and the autonomous vehicle 100, a relative speed between the object 200 and the autonomous vehicle 100, and/or the like, by analyzing the sensed object 200, under the control of the processor 110.

As shown in FIGS. 6A-7B, the autonomous vehicle 100 may collect the determined braking distance and the predicted at least one of the movement or the direction of the object 200 and may re-determine the braking distance between the autonomous vehicle 100 and the object 200 based on a result of the collecting, under the control of the processor 110.

The autonomous vehicle 100 may control the FCA system or control steering based on the re-determined braking distance, under the control of the processor 110.

Figure 6A:
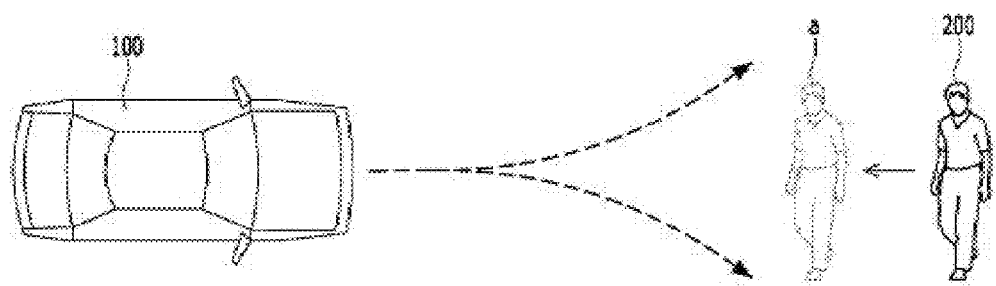
FIGS. 6A-7B are diagrams illustrating a method of controlling an FCA system or steering, according to another embodiment of the present disclosure.
Figure 6B:

As shown in FIGS. 6A and 6B, when the object 200 moves in a longitudinal direction, the autonomous vehicle 100 may collect a determined braking distance and a longitudinal movement of the object 200 and may re-determine a braking distance between the autonomous vehicle 100 and the object 200 based on a result of the collecting, under the control of the processor 110.

For example, as shown in FIG. 6A, when the object 200 moves in the longitudinal direction but moves in a longitudinal direction (a) towards to the autonomous vehicle 100, the autonomous vehicle 100 may determine that the re-determined braking distance is not satisfied and may control the steering instead of the FCA system to avoid the object 200, under the control of the processor 110.

In contrast, as shown in FIG. 6B, when the object 200 moves in the longitudinal direction but moves in a longitudinal direction (b) away from the autonomous vehicle 100, the autonomous vehicle 100 may determine that the re-determined braking distance is satisfied and activate the FCA system for braking to prevent a collision with the object 200, under the control of the processor 110.

Figure 7A:
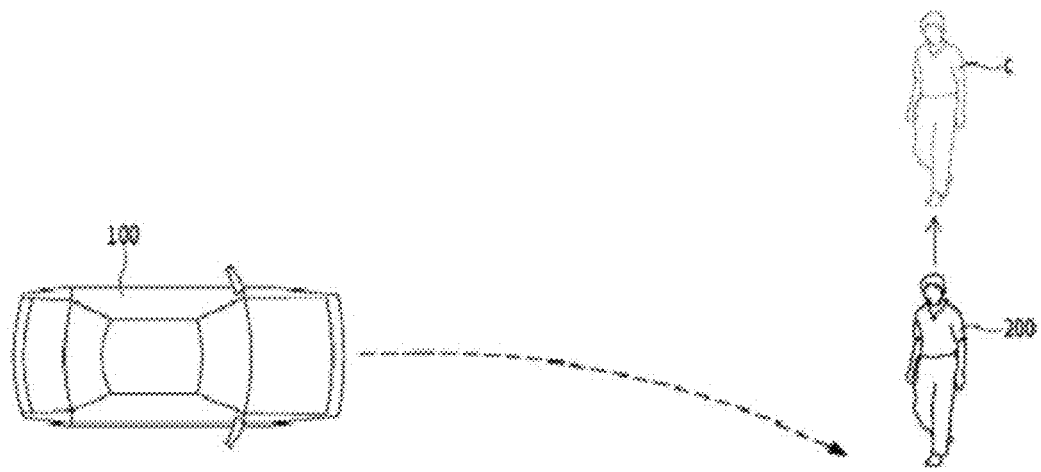
Figure 7B:
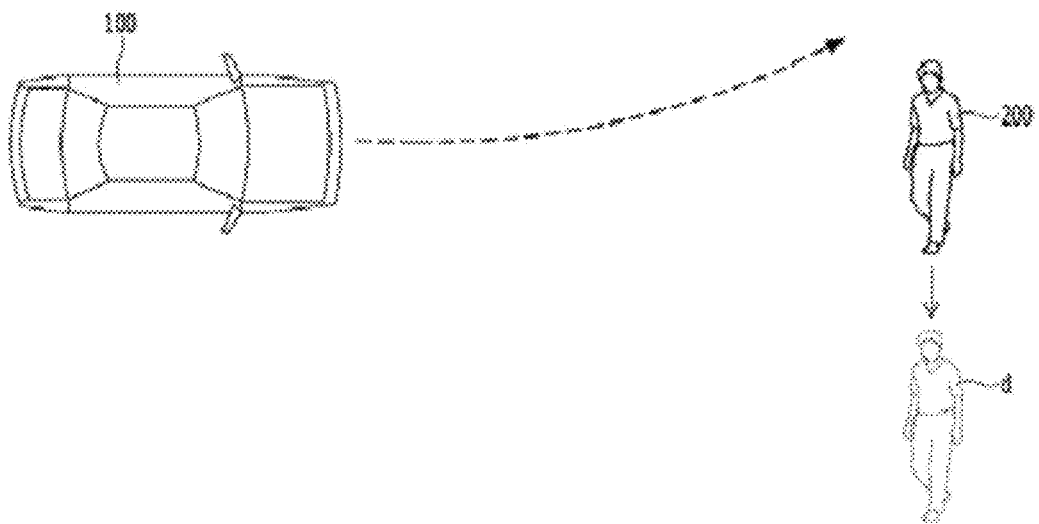

In addition, as shown in FIGS. 7A and 7B, when the object 200 moves in a lateral direction (c or d), the autonomous vehicle 100 may control the steering such that it steers to move in a direction opposite to a direction in which the object 200 moves, regardless of the re-determined braking distance, to avoid the object 200, under the control of the processor 110.

As described above, an autonomous vehicle (e.g., the autonomous vehicle 100) and control method thereof may recognize early a pedestrian (e.g., the pedestrian 200) present ahead in the distance using a front radar and a front camera while the autonomous vehicle 100 is driven by a driver on a dark road at night with a low beam. The autonomous vehicle 100 and the control method thereof may then switch the low beam to a high beam to operate the high beam to illuminate the whole body of the pedestrian 200 such that the front camera identifies the pedestrian 200. The autonomous vehicle 100 and the control method thereof may thus allow FCA function warning and braking control to be performed at a suitable time, thereby improving the driving stability of the autonomous vehicle 100.

In addition, an autonomous vehicle (e.g., the autonomous vehicle 100) and control method thereof may use the front radar capable of sensing an object (e.g., the pedestrian 200) present ahead in the distance to allow the autonomous vehicle 100 driving on a dark road at night with the low beam to recognize the pedestrian 200 normally. The autonomous vehicle 100 and the control method thereof may also use the front camera to recognize a lower body of the pedestrian 200, thereby enhancing recognition accuracy.

In addition, an autonomous vehicle (e.g., the autonomous vehicle 100) and control method thereof may determine the pedestrian 200 present in the distance on a dark road using an enhanced method, switch a headlight from the low beam to the high beam such that the front camera quickly recognizes the pedestrian 200 present ahead, and control warning and braking of an FCA function at a normal timing.

In addition, an autonomous vehicle (e.g., the autonomous vehicle 100) and control method thereof may switch the control to steering control, rather than FAC braking control, when a collision is expected because the pedestrian 200 is recognized relatively late and a braking distance is not sufficient, thereby facilitating the avoidance of the pedestrian 200.

The embodiments of the present disclosure described herein may be implemented as computer-readable instructions on a computer-readable medium in which a program is recorded. The computer-readable medium may include various types of recording devices that store data to be read by a computer system. The computer-readable medium may include, for example, a hard disk drive (HDD), a solid-state drive (SSD), a silicon disk drive (SDD), a read-only memory (ROM), a random-access memory (RAM), a compact disc ROM (CD-ROM), a magnetic tape, a floppy disk, an optical data storage device, or the like.

The foregoing detailed description should not be construed as restrictive but as illustrative in all respects. The scope of the embodiments of the present disclosure should be determined by reasonable interpretation of the appended claims, and all changes and modifications within the equivalent scope of the present disclosure are included in the scope of the present disclosure.

What is claimed is:

1. A method of controlling an autonomous vehicle, the method comprising:
   sensing, using a first sensor, an object located in front of the autonomous vehicle as the autonomous vehicle is driving on a driving path using a low beam of a headlight mounted on the autonomous vehicle;
   when a portion of the object is exposed by the low beam and is additionally sensed by a second sensor, switching, by a processor, the low beam to a high beam;
   in response to switching to the high beam, setting, by the processor, the object to be a target; and
   determining, by the processor, a braking distance between the autonomous vehicle and the target.

2. The method of claim 1, further comprising controlling, by the processor, a forward collision-avoidance assist (FCA) system or steering of the autonomous vehicle, based on the determined braking distance.

3. The method of claim 2, wherein controlling the FCA system or the steering includes controlling the FCA system in response to determining, by the processor, that the determined braking distance is greater than a preset safety distance.

4. The method of claim 2, wherein controlling the FCA system or the steering includes controlling the steering in response to determining, by the processor, that the determined braking distance is less than a preset safety distance.

5. The method of claim 1, wherein switching the low beam to the high beam includes switching the low beam gradually to the high beam.

6. The method of claim 1, further comprising predicting, by the processor, at least one of a movement of the object or a direction of the object while determining the braking distance.

7. The method of claim 6, further comprising re-determining, by the processor, the braking distance based on the at least one of the movement of the object or the direction of the object.

8. The method of claim 7, further comprising controlling, by the processor, a forward collision-avoidance assist (FCA) system or steering of the autonomous vehicle, based on the re-determined braking distance.

9. A non-transitory computer-readable storage medium storing instructions that, by being executed by a processor, cause the processor to:
   sense, using a first sensor, an object located in front of an autonomous vehicle as the autonomous vehicle is driving on a driving path using a low beam mounted on the autonomous vehicle;
   when a portion of the object is exposed by the low beam and is additionally sensed by a second sensor, switch the low beam to a high beam
   in response to switching to the high beam, set the object to be a target; and
   determine a braking distance between the autonomous vehicle and the target.

10. An autonomous vehicle, comprising:
    a headlight;
    a first sensor;
    a second sensor; and
    a processor configured to control the headlight,
    wherein the processor is configured to
       sense an object located in front of the autonomous vehicle using the first sensor as the autonomous vehicle is driving on a driving path using a low beam,
       when a portion of the object is exposed by the low beam and is additionally sensed by the second sensor, switch the low beam to a high beam,
       in response to switching to the high beam, set the object to be a target, and
       determine a braking distance between the autonomous vehicle and the target.

11. The autonomous vehicle of claim 10, wherein the processor is further configured to control a forward collision-avoidance assist (FCA) system or steering, based on the determined braking distance.

12. The autonomous vehicle of claim 11, wherein the processor is configured to control the FCA system in response to determining that the determined braking distance is greater than a preset safety distance.

13. The autonomous vehicle of claim 11, wherein the processor is configured to control the steering in response to determining that the determined braking distance is less than a preset safety distance.

14. The autonomous vehicle of claim 10, wherein the processor is configured to switch the low beam gradually to the high beam.

15. The autonomous vehicle of claim 10, wherein the processor is further configured to predict at least one of a movement of the object or a direction of the object while determining the braking distance.

16. The autonomous vehicle of claim 15, wherein the processor is further configured to re-determine the braking distance based on the at least one of a movement of the object or a direction of the object.

17. The autonomous vehicle of claim 16, wherein the processor is further configured to control a forward collision-avoidance assist (FCA) system or steering, based on the re-determined braking distance.

* * * * *